United States Patent
Robinton et al.

(10) Patent No.: US 8,332,498 B2
(45) Date of Patent: Dec. 11, 2012

(54) SYNCHRONIZED RELAY MESSAGING AND COORDINATED NETWORK PROCESSING USING SNMP

(75) Inventors: Mark Robinton, Somerville, MA (US); Scott B. Guthery, Chestnutt Hill, MA (US)

(73) Assignee: Assa Abloy AB (SE)

( * ) Notice: Subject to any disclaimer, the term of this patent is extended or adjusted under 35 U.S.C. 154(b) by 181 days.

(21) Appl. No.: 12/627,822

(22) Filed: Nov. 30, 2009

(65) Prior Publication Data
US 2010/0235360 A1 Sep. 16, 2010

Related U.S. Application Data

(60) Provisional application No. 61/160,183, filed on Mar. 13, 2009.

(51) Int. Cl.
*G06F 15/173* (2006.01)
(52) U.S. Cl. ........ 709/223; 709/203; 709/238; 370/338; 370/389
(58) Field of Classification Search .................. 709/203, 709/223, 224; 370/338
See application file for complete search history.

(56) References Cited

U.S. PATENT DOCUMENTS

| | | | |
|---|---|---|---|
| 3,920,896 A * | 11/1975 | Bishop et al. ............ 379/100.13 |
| 3,958,088 A * | 5/1976 | Vieri ........................ 379/100.13 |
| 4,703,503 A | 10/1987 | Asai | |
| 5,377,997 A | 1/1995 | Wilden et al. | |
| 5,438,650 A | 8/1995 | Motoyama et al. | |
| 5,572,195 A | 11/1996 | Heller et al. | |
| 5,651,006 A | 7/1997 | Fujino et al. | |
| 5,758,083 A | 5/1998 | Singh et al. | |
| 5,828,830 A | 10/1998 | Rangaraian et al. | |
| 5,987,513 A | 11/1999 | Prithviraj et al. | |
| 6,219,718 B1 | 4/2001 | Villalpando | |
| 6,272,542 B1 * | 8/2001 | Barnes et al. ................. 709/224 |
| 6,356,949 B1 | 3/2002 | Katsandres et al. | |
| 6,360,258 B1 | 3/2002 | LeBlanc | |
| 6,367,011 B1 | 4/2002 | Lee et al. | |
| 6,484,225 B2 | 11/2002 | Sheikh et al. | |
| 6,490,680 B1 | 12/2002 | Scheidt et al. | |
| 6,516,357 B1 | 2/2003 | Hamann et al. | |
| 6,616,535 B1 | 9/2003 | Nishizaki et al. | |
| 6,675,351 B1 | 1/2004 | Leduc | |
| 6,757,280 B1 | 6/2004 | Wilson, Jr. | |
| 6,823,453 B1 | 11/2004 | Hagerman | |
| 6,880,752 B2 | 4/2005 | Tarnovsky et al. | |

(Continued)

FOREIGN PATENT DOCUMENTS
EP 1724684 5/2005
(Continued)

OTHER PUBLICATIONS

U.S. Appl. No. 12/480,505, filed Jun. 8, 2009, Guthery.

(Continued)

*Primary Examiner* — Tesfay Yohannes
(74) *Attorney, Agent, or Firm* — Sheridan Ross P.C.

(57) ABSTRACT

Methods, devices, and systems are provided for utilizing asynchronous messaging protocols, such as the Simple Network Management Protocol (SNMP), to implement relay messaging through a network, gather data from and/or set parameters on a plurality of managed devices in a network through the issuance and transmission of a single SNMP message, and/or cause multiple managed devices to perform cooperative and coordinated computations through the issuance of a single SNMP message.

19 Claims, 4 Drawing Sheets

U.S. PATENT DOCUMENTS

| | | | |
|---|---|---|---|
| 6,959,394 | B1 | 10/2005 | Brickell et al. |
| 6,986,139 | B1* | 1/2006 | Kubo .................... 718/105 |
| 7,036,146 | B1 | 4/2006 | Goldsmith |
| 7,070,091 | B2 | 7/2006 | Hepworth et al. |
| 7,092,915 | B2 | 8/2006 | Best et al. |
| 7,171,654 | B2* | 1/2007 | Werme et al. ........... 717/130 |
| 7,194,628 | B1 | 3/2007 | Guthery |
| 7,242,694 | B2 | 7/2007 | Beser |
| 7,270,266 | B2 | 9/2007 | Silverbrook et al. |
| 7,321,566 | B2 | 1/2008 | Fu |
| 7,363,489 | B2 | 4/2008 | Burakoff et al. |
| 7,406,592 | B1 | 7/2008 | Polyudov |
| 7,506,041 | B1 | 3/2009 | Shelton et al. |
| 7,620,041 | B2* | 11/2009 | Dunn et al. .............. 370/389 |
| 7,669,212 | B2* | 2/2010 | Alao et al. ............... 725/32 |
| 7,716,355 | B2 | 5/2010 | McCloghrie et al. |
| 7,742,183 | B2 | 6/2010 | Sato |
| 7,788,403 | B2* | 8/2010 | Darugar et al. .......... 709/238 |
| 7,853,643 | B1* | 12/2010 | Martinez et al. ......... 709/203 |
| 2002/0138582 | A1 | 9/2002 | Chandra et al. |
| 2002/0199096 | A1 | 12/2002 | Wenocur et al. |
| 2003/0115466 | A1 | 6/2003 | Aull et al. |
| 2003/0131051 | A1* | 7/2003 | Lection et al. .......... 709/203 |
| 2004/0040026 | A1 | 2/2004 | Farrugia |
| 2004/0151322 | A1 | 8/2004 | Sovio et al. |
| 2004/0158625 | A1 | 8/2004 | Neale |
| 2004/0204778 | A1 | 10/2004 | Lalapeth et al. |
| 2005/0105508 | A1 | 5/2005 | Saha |
| 2005/0262229 | A1 | 11/2005 | Gattu et al. |
| 2006/0023674 | A1* | 2/2006 | Goring et al. ........... 370/338 |
| 2006/0053210 | A1 | 3/2006 | Dague et al. |
| 2006/0059253 | A1 | 3/2006 | Goodman et al. |
| 2006/0095957 | A1 | 5/2006 | Lundblade et al. |
| 2007/0057057 | A1 | 3/2007 | Andresky et al. |
| 2007/0064623 | A1 | 3/2007 | Brahmaroutu |
| 2007/0067833 | A1 | 3/2007 | Colnot |
| 2007/0169183 | A1 | 7/2007 | Kipnis et al. |
| 2007/0174907 | A1 | 7/2007 | Davis |
| 2007/0180086 | A1 | 8/2007 | Fang et al. |
| 2007/0209040 | A1 | 9/2007 | Alstad |
| 2007/0217425 | A1 | 9/2007 | Mclaise et al. |
| 2007/0249323 | A1 | 10/2007 | Lee et al. |
| 2007/0276935 | A1 | 11/2007 | Liu |
| 2007/0282951 | A1 | 12/2007 | Selimis et al. |
| 2008/0016370 | A1 | 1/2008 | Libin et al. |
| 2008/0095339 | A1 | 4/2008 | Elliott et al. |
| 2008/0133391 | A1 | 6/2008 | Kurian et al. |
| 2008/0204429 | A1 | 8/2008 | Silverbrook et al. |
| 2009/0013190 | A1 | 1/2009 | Benhammou et al. |
| 2009/0028118 | A1* | 1/2009 | Gray et al. ............... 370/338 |
| 2009/0157700 | A1 | 6/2009 | Van Vugt |
| 2010/0077091 | A1 | 3/2010 | Sarkar et al. |
| 2011/0264926 | A1 | 10/2011 | Guthery |

FOREIGN PATENT DOCUMENTS

| | | |
|---|---|---|
| EP | 1895445 | 3/2008 |
| WO | WO 2005/078465 | 8/2005 |

OTHER PUBLICATIONS

"RFC 1661: The Point-to-Point Protocol (PPP)," Network Working Group (W. Simpson, ed.), Jul. 1994, pp. 1-52.

"RFC 707: A High-Level Framework for Network-Based Resource Sharing," Network Working Group, Jan. 1976, pp. 1-28.

Aboba, B. et al., "RFC 3748, Extensible Authentication Protocol," Network Working Group (H. Levkowetz, ed.), Jun. 2004, pp. 1-67.

Arkko, J. et al., "RFC 4187: Extensible Authentication Protocol Method for 3rd Generation Authentication and Key Agreement (EAP-AKA)," Network Working Group, Jan. 2006, pp. 1-79.

Benaloh, J. et al., "Generalized Secret Sharing and Monotone Functions," Advances in Cryptology—CRYPTO '88, Santa Barbara, CA (S. Goldwasser ed., Aug. 1988); Lecture Notes in Computer Science, vol. 403 (G. Goos and J. Hartmanis, eds. 1990), pp. 27-35.

Blumenthal, U. et al., "RFC 3826: The Advanced Encryption Standard (AES) Cipher Algorithm in the SNMP User-based Security Model," Network Working Group, Dec. 2002, pp. 1-16.

Blumenthal, U. et al., "Standard 62—RFC 3414: User-based Security Model (USM) for Version 3 of the Simple Network Management Protocol (SNMPv3)," Network Working Group, Dec. 2002, available at www.ietf.org/rfc/rfc3414.txt, pp. 1-88.

Bormann, C. et al., "RFC 3095: RObust Header Compression (ROHC): Framework and Four Profiles: RTP, UDP, ESP, and Uncompressed," Network Working Group, Jul. 2001, available at www.ietf.org/rfc/rfc3095.txt, pp. 168.

Case, J. et al., "Standard 62—RFC 3412: Message Processing and Dispatching for the Simple Network Management Protocol (SNMP)," Network Working Group, Dec. 2002, available at www.ietf.org/rfc/rfc3412.txt, pp. 1-43.

Casner, S. et al., "RFC 2508: Compressing IP/UDP/RTP Headers for Low-Speed Serial Links," Network Working Group, Feb. 1999, pp. 1-24.

Chiu, A., "RFC 2695: Authentication Mechanisms for ONC RPC," Network Working Group, Sep. 1999, pp. 1-18.

Degermark, M., ed., "RFC 3096: Requirements for Robust IP/UDP/RTP Header Compression," Network Working Group, Jul. 2001, pp. 1-8.

Eisler, M., ed., "RFC 4506: XDR: External Data Representation Standard," replaced RFC 1832, Network Working Group, May 2006, pp. 1-27.

Finking, R. et al., "RFC 4997: Formal Notation for RObust Header Compression (ROHC-FN)," Network Working Group, Jul. 2007, pp. 1-62.

Geer, D.E. et al., "Threshold Cryptography for the Masses," Sixth International Financial Cryptography Conference, Southampton, Bermuda, Mar. 2002, Revised Papers, Lecture Notes in Computer Science, vol. 2357 (2003), pp. 220-237.

Guthery, S. et al., "IP and ARP over ISO 7816," Internet Draft, Network Working Group, Jan. 2001, pp. 1-8.

Guthery, S. et al., "IP/TCP/UDP Header Compression for ISO 7816 Links," Internet Draft, Network Working Group, Jan. 2001, pp. 1-8.

Guthery, S., "EchoNets, E-memes, and Extended Realities," Dr. Dobb's Journal, Apr. 1, 1994, pp. 72-84, also available at http://www.drdobbs.com/architect/184409220.

Guthery, S., "Wireless Relay Networks," IEEE Network, vol. 11, No. 6, Nov.-Dec. 1997, pp. 46-51.

Guthery, S.B., "Group Authentication Using the Naccache-Stern Public-Key Cryptosystem", arXiv.org > cs > arXiv:cs/0307059 (2003), 7 pages.

Harrington, D. et al., "Secure Shell Transport Model for SNMP," Internet Draft, Network Working Group, Oct. 11, 2006, pp. 1-37.

Harrington, D. et al., "Standard 62—RFC 3411: An Architecture for Describing Simple Network Management Protocol (SNMP) Management Frameworks," Network Working Group, Dec. 2002, available at www.ietf.org/rfc/rfc3411.txt, pp. 1-64.

Harrington, D. et al., "Transport Subsystem for the Simple Network Management Protocol (SNMP)," Internet Draft, Network Working Group, Dec. 13, 2006, pp. 1-34.

Harrington, D., "Transport Security Model for SNMP," Internet Draft, Network Working Group, Oct. 11, 2006, pp. 1-34.

Housley, R. et al. "RFC 4334: Certificate Extensions and Attributes Supporting Authentication in Point-to-Point Protocol (PPP) and Wireless Local Area Networks (WLAN)," Network Working Group, Feb. 2006, pp. 1-11.

Jonson, L-E. et al., RFC 4815: RObust Header Compression (ROHC): Corrections and Clarifications to RFC 3095, Network Working Group, Feb. 2007, pp. 1-33.

Jonsson, L-E. et al., "RFC 4995: The Robust Header Compression (ROHC) Framework," Network Working Group, Jul. 2007, pp. 1-40.

Jonsson, L-E., "RFC 3759: RObust Header Compression (ROHC): Terminology and Channel Mapping Examples," Network Working Group, Apr. 2004, pp. 1-20.

Koren, T. et al., "RFC 3544: IP Header Compression over PPP," Network Working Group, Jul. 2003, pp. 1-14.

Larzen, L-A. et al. "RFC 3828: The Lightweight User Datagram Protocol (UDP-Lite)," Network Working Group, Sep. 2006, pp. 1-12.

Leach, P. et al., "RFC 4122: A Universally Unique IDentifier (UUID) URN Namespace," Network Working Group, Jul. 2005, pp. 1-32.

Levi, D. et al., "Standard 62—RFC 3413: Simple Network Management Protocol (SNMP) Application," Network Working Group, Dec. 2002, available at www.ietf.org/rfc/rfc3413.txt, pp. 1-74.

McCloghrie, K. et al., eds., "RFC 2579: Textual Conventions for SMIv2," Network Working Group, Apr. 1999, pp. 1-26.

McCloghrie, K. et al., eds., "RFC 2580: Conformance Statements for SMIv2," Network Working Group, Apr. 1999, pp. 1-29.

McCloghrie, K., ed., "Standard 58—RFC 2578: Structure of Management Information Version 2 (SMIv2)," Network Working Group, Apr. 1999, pp. 1-43.

Naccache et al., "A New Public-Key Cryptosystem," published in W. Fumy, Ed., Advances in Cryptology—Eurocrypt '97, vol. 1233 of Lecture Notes in Computer Science, pp. 27-36, Springer-Verlag, 1997.

Neuman, C. et al., "RFC 4120: The Kerberos Network Authentication Service (V5)," Network Working Group, Jul. 2005, pp. 1-138.

Pelletier, G., "RFC 4019: RObust Header Compression (ROHC): Profiles for User Datagram Protocol (UDP) Lite," Network Working Group, Apr. 2005, pp. 1-23.

Prafullchandra, H., "RFC 2875: Diffie-Hellman Proof-of-Possession Algorithms," Network Working Group, Jul. 2000, pp. 1-23.

Presuhn, R., ed., "Standard 62—RFC 3416: Version 2 of the Protocol Operations for the Simple Network Management Protocol (SNMP)," Network Working Group, Dec. 2002, pp. 1-31.

Presuhn, R., ed., "Standard 62—RFC 3417: Transport Mappings for the Simple Network Management Protocol (SNMP)," Network Working Group, Dec. 2002, pp. 1-19.

Presuhn, R., ed., Standard 62—RFC 3418: Management Information Base (MIB) for the Simple Network Management Protocol (SNMP), Network Working Group, Dec. 2002, pp. 1-26.

Rescorla, E., "RFC 2631: Diffie-Hellman Key Agreement Method," Network Working Group, Jun. 1999, pp. 1-13.

Shamir, "How to Share a Secret," Communications for the ACM, Nov. 1979, pp. 612-613.

Simpson, W., "RFC 1994: PPP Challenge Handshake Authentication Protocol (CHAP)," Network Working Group, Aug. 1996, pp. 1-12.

Simpson, W., ed., "RFC 1662: PPP in HDLC-like Framing," Network Working Group, Jul. 1994, pp. 1-25.

Srinivasan, R. et al., "RFC 1831: RPC: Remote Procedure Call Protocol Specification Version 2," Network Working Group, Aug. 1995, pp. 1-18.

Vanderveen, M. et al., RFC 4763: Extensible Authentication Protocol Method for Shared-secret Authentication and Key Establishment (EAP-SAKE), Network Working Group, Nov. 2006, pp. 1-46.

Vollbrecht, J. et al., "RFC 4137: State Machines for Extensible Authentication Protocol (EAP) Peer and Authenticator," Network Working Group, Aug. 2005, pp. 1-51.

Wijnen, B. et al., "Standard 62—RFC 3415: View-based Access Control Model (VACM) for the Simple Network Management Protocol (SNMP)," Network Working Group, Dec. 2002, available at www.ietf.org/rfc/rfc3415.txt, pp. 1-39.

ISO/IEC 8825-1, "Information technology—ASN.1 encoding rules: Specification of Basic Encoding Rules (BER), Canonical Encoding Rules (CER) and Distinguished Encoding Rules (DER)," 2008.

Wieringa, R. et al., "The identification of objects and roles," Technical Report IR-267, Faculty of Mathematics and Computer Science, Vrije Universiteit, Amsterdam, 1991, pp. 1-15.

International Search Report for International (PCT) Patent Application No. PCT/US10/26765, mailed May 12, 2010.

Written Opinion for International (PCT) Patent Application No. PCT/US10/26765, mailed May 12, 2010.

International Preliminary Report on Patentability for International (PCT) Patent Application No. PCT/US2010/026765, dated Sep. 13, 2011 8 pages.

* cited by examiner

SYNCHRONIZED RELAY MESSAGING AND COORDINATED NETWORK PROCESSING USING SNMP

CROSS-REFERENCE TO RELATED APPLICATIONS

This application claims the benefit of U.S. Provisional Application No. 61/160,183, filed Mar. 13, 2009, the entire disclosure of which is hereby incorporated herein by reference.

FIELD OF THE INVENTION

The present invention relates generally to device networks and management of the same.

BACKGROUND

The Internet's Simple Network Management Protocol (SNMP) as standardized by the Internet Engineering Task Force (IETF) is typically used by network management programs and network management dashboards to retrieve current status information from remote computer network devices and services such as printers, routers, databases and Web servers. The device managing the network, usually referred to as the managing device, typically includes a network management program that allows the device to send out a GET request to a remote device, which may also be referred to as a managed device. The GET request is formatted to request information on a particular aspect of service provided by the managed device. The managed device responds to the GET request with the status of the service requested by the managing device. For example, a network management program might request the ink level of a remote printer with a GET request. Upon receiving the GET request, the remote printer would respond with the current level of ink in the printer.

SNMP can also be used by network management programs to SET parameters in remote services. For example, a network management program could set the time at which a Web server should terminate an operation.

The details of SNMP and particularly the structure of GET requests, SET commands, and other SNMP operations and messages are further defined in IETF Request For Comment (RFC) 3416, the entire contents of which are hereby incorporated herein by reference.

The operations defined in RFC 3416 include the following:
GET
GET-NEXT
GET-BULK
RESPONSE
SET
INFORM
TRAP
REPORT In the case of setting a parameter or performing an action on a managed device, it is important that the network management program receive positive acknowledgement that its instructions have been received and successfully carried out. Furthermore, since the managed device may have modest computation capabilities and may be on a relatively slow-speed communication link, the network management program is typically configured to wait for acknowledgement for a considerable length of time (e.g., 5 seconds to 5 minutes, which is relatively long in the computer and computer communications context). While waiting, the network management program is usually not allowed to perform any other actions or send out any other messages to manage other network devices. As can be appreciated by one skilled in the art, this greatly reduces the overall efficiency of network management programs.

Another drawback to current implementations of SNMP is that managing devices utilize a point-to-point method of communication. For example, when a managing device needs to gather data from ten managed devices in the network, the managing device needs to send out ten SNMP messages (i.e., one GET message to each managed device). As can be appreciated by one skilled in the art, the transmission of ten separate messages from the managing device is an inefficient use of already constrained network bandwidth and processing resources.

SUMMARY

Accordingly, there exists a need for mechanisms that utilize SNMP with greater efficiency.

It is thus one aspect of the present invention to harness properties of SNMP in accordance with RFC 3416 to implement relay messaging through a network. More specifically, one or more SNMP messages may be configured to trigger processing on a node (i.e., a managed device) when the message is received.

It is another aspect of the present invention to provide a managing device with the ability to gather data from a plurality of managed devices in a network through the issuance and transmission of a single SNMP message.

It is yet another aspect of the present invention to provide a managing device with the ability to set parameters of a plurality of managed devices in a network through the issuance and transmission of a single SNMP message.

It is still another aspect of the present invention to provide a managing device with the ability to gather data and set parameters of different managed devices in a network through the issuance and transmission of a single SNMP message.

It is still another aspect of the present invention to provide a managing device with the ability to gather data and set multiple parameters of a single managed device in a network through the issuance and transmission of a single SNMP message.

It is another aspect of the present invention to issue one or more SNMP messages from a managing device that cause multiple managed devices to perform cooperative and coordinated computations. Thus, it may be possible to cause managed devices to synchronize their activity with other managed devices.

It is another aspect of the present invention to provide a managing device with the ability to transmit an SNMP message and not wait for an acknowledgement of receipt or completion of processing of the SNMP message. Rather, the managing device is allowed to continue processing in the absence of receiving an acknowledgement. Furthermore, the managing device can transmit one or more queries to the managed device after the initial SNMP message has been transmitted to determine if the processing of the SNMP message has completed.

In accordance with at least some embodiments of the present invention, semaphore semantics are imparted to existing SET and GET messages (i.e., SET and GET messages generated in accordance with RFC 3416). Additionally, SNMP SET and GET messages are provided with the ability to perform or initiate cascaded SET and GET messages in the course of their execution. When used in combination, embodiments of the present invention enable network-wide behavior including bucket brigade messaging, data scatter and gather, and synchronized processing.

In accordance with at least some embodiments of the present invention, a method is provided that generally comprises:

receiving, at a managed device, an asynchronous message containing instructions for the managed device to perform a work item; and processing the work item at the managed device, wherein during processing the managed device performs one or more of the following actions (i) generating a subsequent asynchronous message for transmission to another managed device; (ii) placing the work item in a work item queue comprising a plurality of work items to be performed for a plurality of different work item requestors; and (iii) generating a plurality of subsequent asynchronous messages for transmission to one or more managed devices.

The Summary is neither intended nor should it be construed as being representative of the full extent and scope of the present invention. The present invention is set forth in various levels of detail and the Summary as well as in the attached drawings and in the detailed description of the invention and no limitation as to the scope of the present invention is intended by either the inclusion or non inclusion of elements, components, etc. in the Summary. Additional aspects of the present invention will become more readily apparent from the detailed description, particularly when taken together with the drawings.

DETAILED DESCRIPTION

The invention will be illustrated below in conjunction with an exemplary communication system. Although well suited for use with, e.g., a system using computers, servers, and other computing devices, the invention is not limited to use with any particular type of computing or communication device or configuration of system elements. Those skilled in the art will recognize that the disclosed techniques may be used in any application in which it is desirable to leverage SNMP to enable network-wide behavior and advanced processing functions.

The exemplary systems and methods of this invention will also be described in relation to analysis software, modules, and associated analysis hardware. However, to avoid unnecessarily obscuring the present invention, the following description omits well-known structures, components and devices that may be shown in block diagram form that are well known, or are otherwise summarized.

For purposes of explanation, numerous details are set forth in order to provide a thorough understanding of the present invention. It should be appreciated, however, that the present invention may be practiced in a variety of ways beyond the specific details set forth herein.

Figure 1:
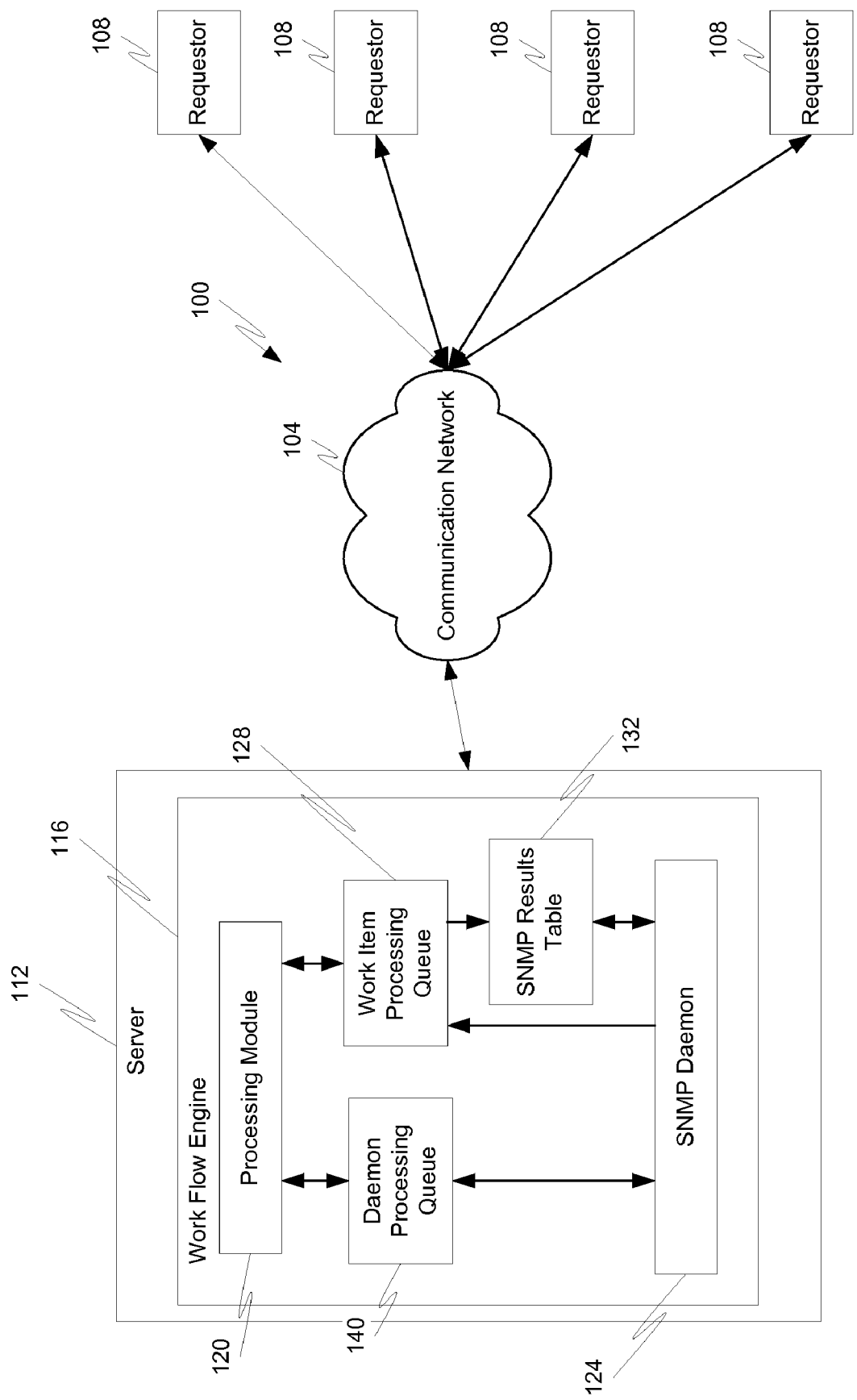
FIG. 1 depicts a communication system in accordance with embodiments of the present invention.

Referring initially to FIG. 1, details of a communication system 100 are depicted in accordance with at least some embodiments of the present invention. The communication system 100 generally includes a communication network 104 that connects a managed device 112 to one or more managing devices 108. The managing devices 108 are depicted as communication devices capable of transmitting a work item request in the form of an asynchronous message, such as an SNMP message, to the managed device 112. The managing devices 108 or requestors may correspond to any type of known administrative computational component or collection of components including, without limitation, an administrative computer or workstation, a control panel, or the like.

The managed device 112 is depicted as a server comprising a work flow engine 116. The work flow engine 116 may comprise a work item processing module 120, an SNMP daemon 124, a work item processing queue 128, an SNMP results table 132, and a daemon processing queue 140. The processing module 120 is responsible for receiving and handling SNMP requests, such as SET and GET messages, when they are initially received at the managed device 112 from a managing device 108.

Upon receiving an SNMP request, the processing module 120 is adapted to determine whether it is currently ready to process the SNMP request or whether the request will need to wait for processing. Generally speaking, the processing module 120 processes SNMP requests on a first-come first-served basis. Thus, if the processing module 120 is currently processing an SNMP request when it receives another request, the later received SNMP request is placed in the work item processing queue 128. The work item processing queue 128 may correspond to a First In First Out (FIFO) queue, although the queue 128 may be organized according to other algorithms. For instance, work items may be assigned a queue position in the work item processing queue 128 based on priority, type of request, identity of the requestor, and combinations thereof.

As will be discussed in further detail below, if a work item is placed in the work item processing queue 128, that work item may be assigned a work item identifier (WID). Furthermore, when a work item is received by the processing module 120, the processing module 120 creates a work item entry in the SNMP results table 132. Initially, the entry is left blank. Once the work item has been processed, however, the results obtained by processing the work item (e.g., a requested variable, a requested parameter, an indication that a variable or parameter has been set to a particular value in one or more managed devices 112, etc.) are placed in the work item entry in the SNMP results table 132.

The WID assigned to a work item can be used to index the work item results or at least the entry location assigned to the work item such that the results can be obtained by the managed device 112 if such information is requested at a later time. More specifically, the use of an SNMP results table 132 allows the managed device 112 to processes asynchronous requests synchronously. Furthermore, the managing device 108 or initiator of the SNMP request does not need to delay other processing or wait for an indication that the SNMP request has been processed. Rather, the managing device 108 can simply submit a done query to the managed device 112 at a later point in time, thereby causing the managed device 112 to refer to the SNMP results table 132 to determine if the work item has been processed yet or if the work item is still in the work item processing queue 128.

Often times, the processing module 120 may need to obtain additional information to process a particular work item. In these instances, the processing module 120 may invoke the SNMP daemon 124 to assist in sub-processing routines. In accordance with at least some embodiments of the present invention, when the processing module 120 needs to invoke the SNMP daemon 124, the processing module 120 creates a work item entry in the daemon processing queue 140. The organization and format of the daemon processing queue 140 may be similar to or different from the organization and format of the work item processing queue 128. For example, the daemon processing queue 140 may be a FIFO queue. Once a work item reaches the top position in the daemon processing queue 140, the SNMP daemon 124 begins processing the work item. During processing, the SNMP daemon 124 may be adapted to send additional SNMP requests, such as SET and GET messages, to other managed devices 112 which may be components within the server 112 and/or other devices external to the server 112.

Results obtained by the SNMP daemon 124 may also be inserted into the SNMP results table 132. These results may be referred to as intermediate results as they will ultimately be used by the processing module 120 to complete the processing of the original work item request. When the processing module 120 identifies that intermediate results have been placed in the SNMP results table 132 by the SNMP daemon 124, the processing module 120 may continue processing the work item request.

In accordance with at least some embodiments of the present invention, the SNMP daemon 124 may insert the results into the appropriate work item entry by determining the WID assigned to the work item by the processing module 120 and then identifying the entry in the SNMP results table 132 which corresponds to that WID. The WID may be communicated by the processing module 120 to the SNMP daemon 124 via the daemon processing queue 140 (e.g., by inserting the WID in the queue along with the work item to be processed by the SNMP daemon 124).

Although only one managed device 112 is depicted in FIG. 1. One skilled in the art will appreciate that a plurality of managed devices 112 may be provided in the communication system 100. In accordance with at least some embodiments of the present invention, one managing device 108 may be adapted to coordinate the processing of multiple other managed devices 112 by issuing a single SNMP message. Additionally, a managed device 112 may be adapted to relay an SNMP message to another managed device 112. Still further, a managed device 112 may be adapted to generate a plurality of SNMP messages for transmission to other managed devices 112 in response to receiving and processing a single SNMP message received from a managing device 108.

Other types of managed devices 112 may include, without limitation, an integrated circuit card, a smart card, a subscriber identity module card, a security authentication module card, a printer, a reader, a component within a printer, a component within a reader, a server, a component within a server, and a credential writer. It should also be noted that a single device or component within a device may act as both a managed device and a managing device.

In accordance with at least some embodiments of the present invention, the communication network 104 is adapted to carry messages between the components connected thereto. Thus, a managing device 108 sends messages to and receives messages from a managed device 112 via the communication network 104. The communication network 104 may comprise any type of known communication network including wired and wireless or combinations of communication networks and may span long or small distances. The protocols supported by the communication network 104 include, but are not limited to, the TCP/IP protocol, Wi-Fi, Wiegand Protocol, RS 232, RS 485, RS422, Current Loop, F2F, Bluetooth, Zigbee, GSM, SMS, optical, audio and so forth. The Internet is an example of the communication network 104 that constitutes a collection of IP networks consisting of many computers and other communication devices located locally and all over the world. The devices may are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a cellular communication network, a satellite communication network, any type of enterprise network, and any other type of packet-switched or circuit-switched network known in the art. It can be appreciated that the communication network 104 need not be limited to any one network type, and instead may be comprised of a number of different networks and/or network types.

In accordance with at least some embodiments of the present invention, the managing device 108 may be adapted to generate an asynchronous request message in the form of an SNMP message. To prepare the SNMP message for transmission over the communication network 104, the managing device 108 may encapsulate the SNMP message in another type of message format capable of being transmitted over the communication network 104. As one example, the SNMP message may be encapsulated in a TCP or UDP packet or collection of packets which are then sent over the communication network 104. The managed device 112 is adapted to receive the packet or packets of information and remove the SNMP message encapsulated therein at which point the managed device 112 can analyze the SNMP message and perform any task necessary to process the request.

Figure 2:
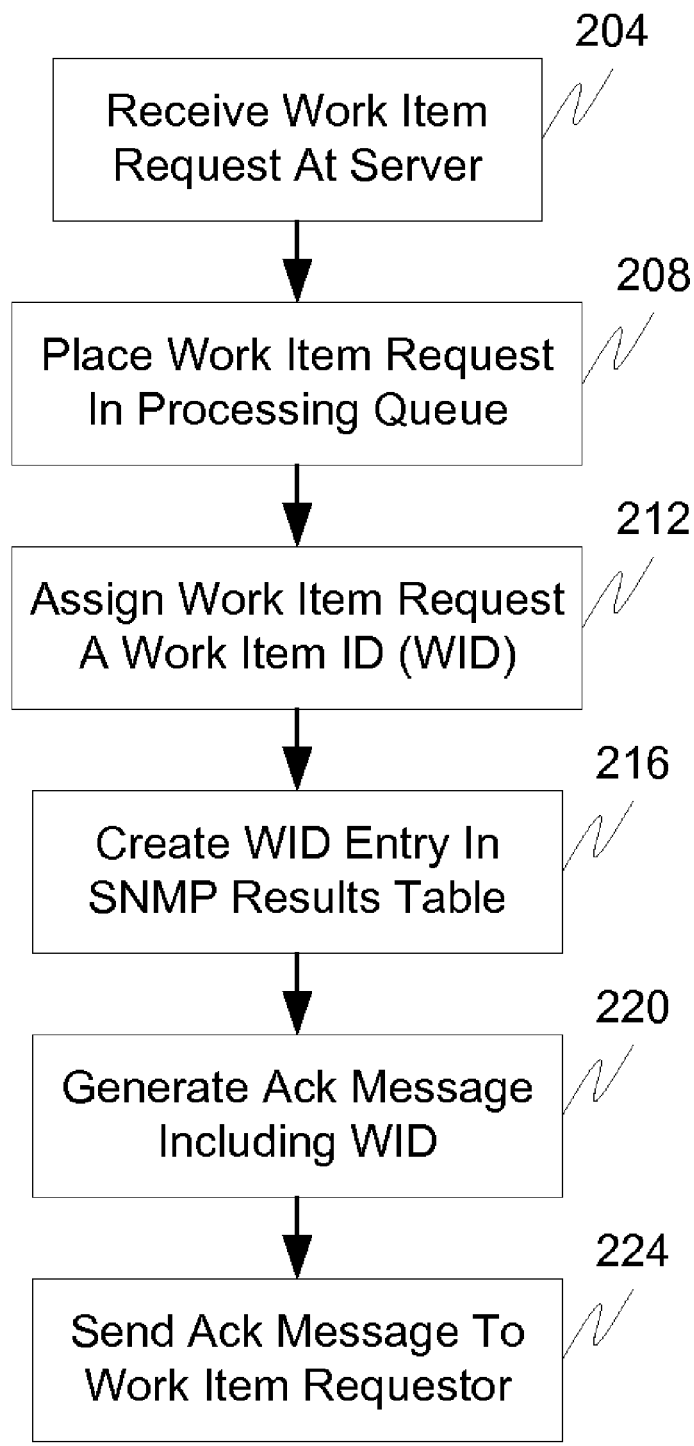
FIG. 2 is a flow chart depicting a method of queuing a work item request in accordance with embodiments of the present invention.

With reference now to FIG. 2, an exemplary method of handling an initially received SNMP request will be discussed in accordance with at least some embodiments of the present invention. The method is initiated when a work item request is received at the managed device 112 (step 204). The work item request may be received in the form of an asynchronous message, such as an SNMP message, containing instructions for the managed device 112 to perform the work item. This step may also require that the managed device 112 extract the asynchronous message from another container-type message that was used to transmit the asynchronous message across the communication network 104. For example, the SNMP message may have been encapsulated in a UDP or TCP packet for transmission across the communication network 104.

Once received, the managed device 112 then invokes the processing module 120 which analyzes the work item request contained within the message and begins processing the work item. Typically speaking, however, the processing module 120 is already processing some other work item, in which case the processing module 120 places the work item in a queue position in the work item processing queue 128 (step 408).

After the work item has been placed in the work item processing queue 128, if such a step was necessary, the processing module 120 continues by assigning a WID to the work item (step 412). The WID assigned to the work item may be a randomly generated number, a number which is a combination of the time the request was received and the requestor of the work item request, a hash or checksum of some metadata contained within the work item, or any other type of identifier that can be used to substantially uniquely identify the work item among a number of other work items being processed by the managed device 112.

Once a WID has been assigned to a work item, the method continues with the processing module 120 creating a work item entry and a corresponding WID entry in the SNMP results table 132 (step 216). The SNMP results table 132 may have a plurality of WIDs indexed to work item results and/or intermediate work item results, which are provided by the SNMP daemon 124. An exemplary set of entries in the SNMP results table 132 may be depicted as follows:

TABLE 1

SNMP Results Table Entries

| WID | Results | Intermediate Results |
|---|---|---|
| WID 1 | Results 1 | Intermediate Results 1 |
| | | Intermediate Results 2 |
| WID 2 | Null | Intermediate Results 1 |
| | | Intermediate Results 2 |
| | | Intermediate Results 3 |
| WID 3 | Results 3 | Null |
| WID N | Null | Null |

As can be seen in Table 1, a work item entry may have final results, intermediate results, and/or no results. The appearance of final results may indicate that the processing module 120 has completed processing a work item, whereas the appearance of intermediate results in the absence of final results may indicate that the SNMP daemon 124 is currently processing a work item and the processing module 120 is waiting on the SNMP daemon 124 to complete processing of sub-tasks assigned to the SNMP daemon 124 by the processing module 120. The absence of results in either the final results column or intermediate results column may indicate that the work item is still waiting in the work item processing queue 128 for processing. As can be appreciated by one skilled in the art, although two columns are depicted for final results and intermediate results, respectively, one skilled in the art will appreciate that a single results column may be indexed to a WID and that single results column may be shared by the processing module 120 and SNMP daemon 124.

Once the entry has been created in the SNMP results table 132, the processing module 120 generates an acknowledgement message for transmission to the managing device 108 which transmitted the work item to the managed device 112 (step 220). During this step, the processing module 120 may include the WID in the message, thereby communicating the WID to the managing device 108. This WID can be used by the managing device 108 at a later time to request the processing status of the work item. The message is then transmitted back to the managing device 108, thereby affirming that the work item has been received and will be processed in due course (step 224). This acknowledgement message is different from prior art acknowledgement messages in that the acknowledgement message transmitted by the processing module 120 simply provides an indication that the work item request has been received, not necessarily that the work item request has been processed. Prior art managing devices 108 would wait for an acknowledgement message indicating that a work item has been processed and that acknowledgement message may, sometimes, also contain results of the processing. This is not necessary in accordance with at least some embodiments of the present invention. Thus, the asynchronous work item requests can be processed synchronously, without violating any requirements associated with utilizing the asynchronous work item requests.

Figure 3:
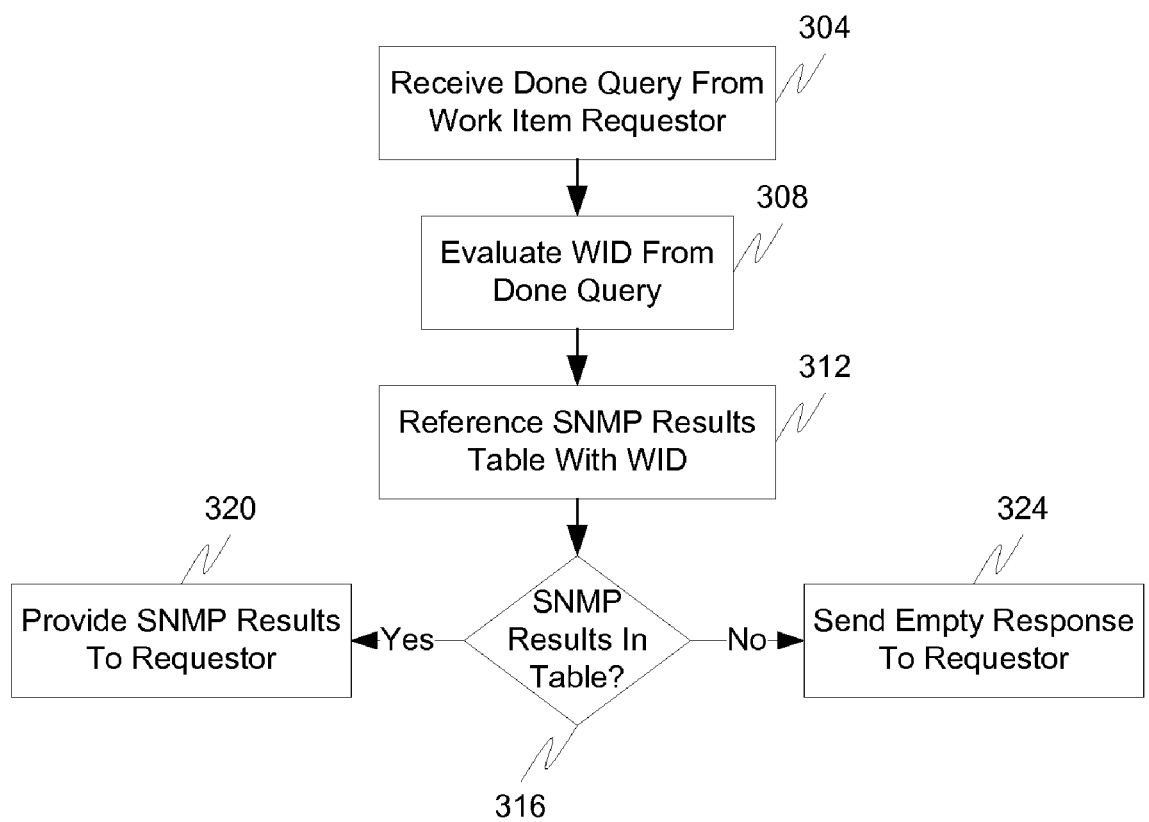
FIG. 3 is a flow chart depicting a method of processing a done query in accordance with embodiments of the present invention.

Referring now to FIG. 3, an exemplary method of responding to a done query will be described in accordance with at least some embodiments of the present invention. As noted above, the managing device 108 does not necessarily have to delay other processing while waiting on the processing module 120 to complete a work item initiated by the managing device 108. Instead, the managing device 108 can transmit one or more done queries to the managed device 112 to determine if the work item has been processed. As can be appreciated by one skilled in the art, the managing device 108 may be configured to transmit done queries on a periodic basis or in response to certain triggers. As an example, the managing device 108 may transmit a done query after a predetermined amount of time has elapsed since the transmission of the last done query. Alternatively, the managing device 108 may transmit a done query in response to some predetermined action or event occurring, such as a power cycle occurring at the managing device 108.

The managing device 108 transmits the done query across the communication network 104 where it is received as the managed device 112 (step 304). The done query may be in the form of an IP-based message or an SNMP message encapsulated within a UDP or TCP packet. The done query may also contain the WID previously communicated to the managing device 108 via the acknowledgement message transmitted by the managed device 112. Thus, the managed device 112 invokes the processing module 120 to evaluate the WID contained within the done query (step 308). This evaluation causes the processing module 120 to refer to the SNMP results table 132 to identify the location of the entry having the corresponding WID provided in the done query (step 312). The processing module 120 evaluates the corresponding SNMP results entries in the table 132 to determine if the work item has been processed (step 316). More specifically, in this step the processing module 120 will analyze the SNMP results table 132 to determine if any final results are included in the table 132. If no final results exist in the SNMP results table 132 for the requested WID, then the processing module 120 will send an empty response back to the managing device 112 which initially transmitted the done query (step 324). If, however, final results are found in the corresponding entry of the SNMP results table 132, then the processing module 120 will provide the results back to the managing device 112 (step 320).

As can be appreciated by one skilled in the art, the processing module 120 may be adapted to automatically transmit to the managing device 108 the final results obtained by processing a work item when such processing has completed. This may be done in the absence of a done query from the managing device 108. The results may still be maintained in the SNMP results table 132 for a predetermined amount of time, incase the managing device 112 or some other managing device 112 requests the results. The amount of time that the results are maintained in the SNMP results table 132 may depend upon the nature of the data and the work item as well as the capacity of the SNMP results table 132 and the need to commit its resources to other work items.

Figure 4:
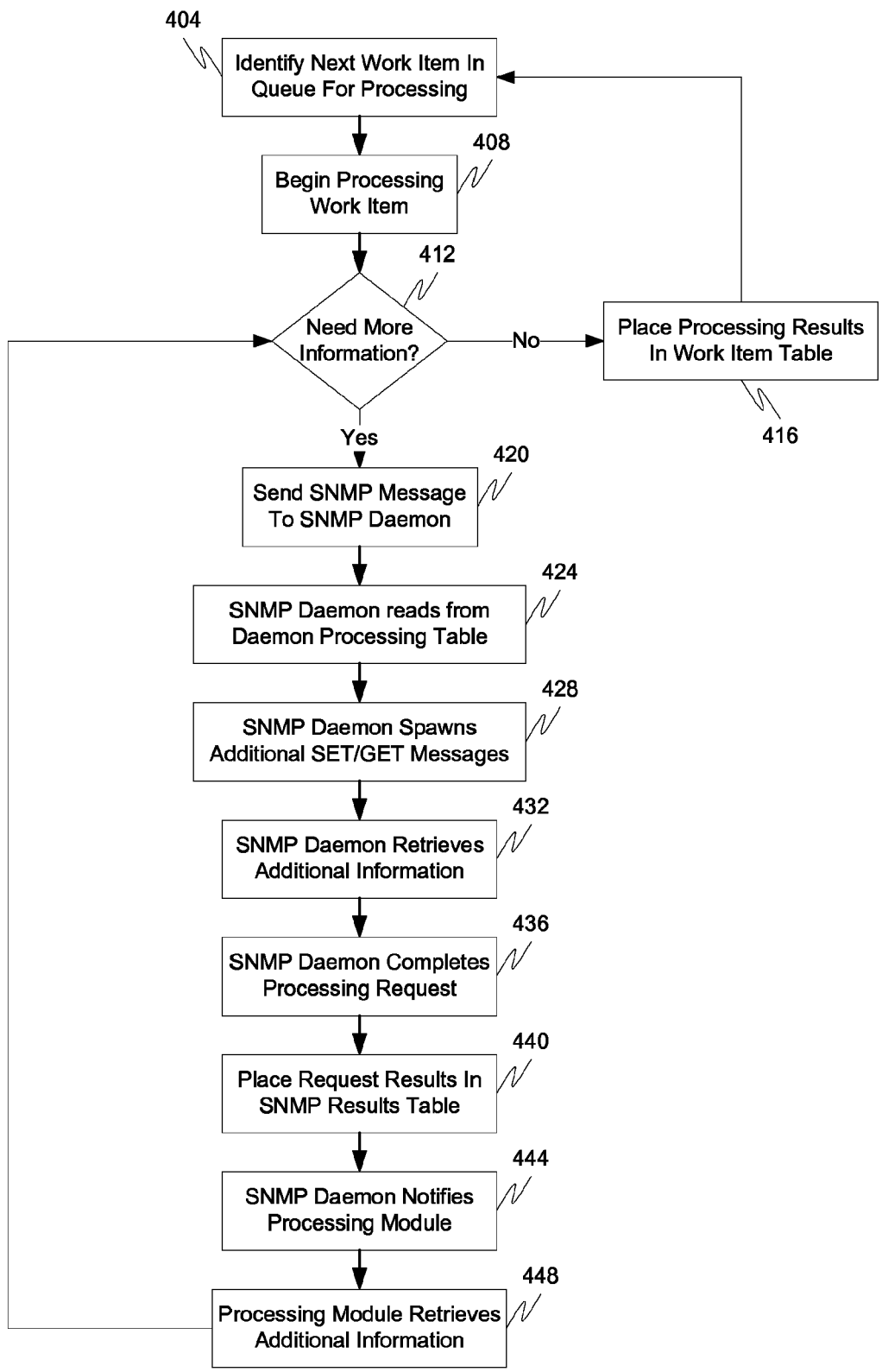
FIG. 4 is a flow chart depicting a method of processing a work item request in accordance with embodiments of the present invention.

Referring now to FIG. 4, an exemplary method of processing a work item will be described in accordance with at least some embodiments of the present invention. The method begins with the processing module 120 identifying the next work item to be processed in the work item processing queue 128 (step 404). The processing module 120 then begins processing the identified work item (step 408). Of course, step 404 may be skipped if no items are currently being processed and no items are in the work item processing queue 128 when a work item request is received.

While processing the work item the processing module 120 determines if additional information is needed from other components not accessible to the processing module 120 (step 412). If this query is answered negatively, then the processing module 120 completes processing of the work item and places the results in the SNMP results table 132 (step 416) and then returns to step 404. Alternatively, or in addition, the processing module 120 may also transmit the processing results to the managing device 108 which initially transmitted the work item request to the managed device 112.

If the query of step 416 is answered affirmatively, then the method continues with the processing module 120 invoking the SNMP daemon 124 (step 420). The processing module 120 does this by sending an SNMP message or some other work item request via the daemon processing queue 140 (step 424). As can be appreciated by one skilled in the art, the SNMP request may simply be placed in the daemon processing queue 140 for retrieval by the SNMP daemon 124. Furthermore, multiple requests may be placed in the daemon processing queue 140 if the processing module 120 needs the daemon 124 to perform a plurality of processing sub-steps in connection with completing the initial work item. Alternatively, the processing module 120 may transmit the SNMP request directly to the SNMP daemon 124, which places the request in the daemon processing queue 140.

The method continues with the SNMP daemon 124 referencing the daemon processing queue 140 (step 424) to retrieve the SNMP request and determine what actions need to be performed in connection with completing the SNMP request. The actions required of the SNMP daemon 124 typically include the need to generate and transmit addition SET and/or GET messages to other managed devices 112 (step 428). The other managed devices 112 may correspond to other components within the server 112 or devices external to the server 112. The SET and/or GET messages are used as a mechanism for retrieving the additional information needed to complete the SNMP request (step 432). After the additional information has been retrieved from the appropriate other managed devices 112, the SNMP daemon 124 completes its processing of the SNMP request (step 436) and places the results in the SNMP results table 132, possibly as intermediate results (step 440).

The simple act of placing the results in the SNMP results table 132 may serve as an indicator to the processing module 120 that the SNMP daemon 124 has completed processing the SNMP request (step 444). Alternatively, the SNMP daemon 124 may send a message to the processing module 120 or the SNMP daemon 124 may remove the SNMP request from the daemon processing queue 140, which may also server as an indicator to the processing module 120 that the SNMP daemon 124 has completed processing the SNMP request. This allows the processing module 120 to retrieve the additional information (e.g., the intermediate results) that it needed the SNMP daemon 124 to gather on its behalf (step 448). Thereafter, the method returns to step 412, where it is determined whether further information is needed by the processing module 120 to complete processing of the work item.

While the above-described flowchart has been discussed in relation to a particular sequence of events, it should be appreciated that changes to this sequence can occur without materially effecting the operation of the invention. Additionally, the exact sequence of events need not occur as set forth in the exemplary embodiments. The exemplary techniques illustrated herein are not limited to the specifically illustrated embodiments but can also be utilized with the other exemplary embodiments and each described feature is individually and separately claimable.

The systems, methods and protocols of this invention can be implemented on a special purpose computer in addition to or in place of the described access control equipment, a programmed microprocessor or microcontroller and peripheral integrated circuit element(s), an ASIC or other integrated circuit, a digital signal processor, a hard-wired electronic or logic circuit such as discrete element circuit, a programmable logic device such as TPM, PLD, PLA, FPGA, PAL, a communications device, such as a server, personal computer, any comparable means, or the like. In general, any device capable of implementing a state machine that is in turn capable of implementing the methodology illustrated herein can be used to implement the various data messaging methods, protocols and techniques according to this invention.

Furthermore, the disclosed methods may be readily implemented in software. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The analysis systems, methods and protocols illustrated herein can be readily implemented in hardware and/or software using any known or later developed systems or structures, devices and/or software by those of ordinary skill in the applicable art from the functional description provided herein and with a general basic knowledge of the computer arts.

Moreover, the disclosed methods may be readily implemented in software that can be stored on a storage medium, executed on a programmed general-purpose computer with the cooperation of a controller and memory, a special purpose computer, a microprocessor, or the like. In these instances, the systems and methods of this invention can be implemented as program embedded on personal computer such as an integrated circuit card applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications device or system.

It is therefore apparent that there has been provided, in accordance with the present invention, systems, apparatuses and methods for synchronizing relay messaging and coordinating network processing using SNMP and other similar protocols. While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

What is claimed is:

1. A method, comprising:
receiving, at an SNMP managed device, an asynchronous message containing instructions for the managed device to perform a work item; and
processing the work item at the managed device, wherein during processing the managed device generates a subsequent asynchronous message for transmission to another managed device, wherein the managed device comprises an SNMP work flow engine residing in a server, the SNMP work flow engine comprising a processing module and an SNMP daemon, wherein the processing module receives the asynchronous message, and wherein the subsequent asynchronous message is transmitted via the SNMP daemon to at least one device not contained within the server.

2. The method of claim 1, wherein during processing the managed device also places the work item in a work item queue comprising a plurality of work items to be performed for a plurality of different work item requestors.

3. The method of claim 2, further comprising:
determining that the work item is the next work item in the work item queue to be processed;
performing at least one action in conformity with the work item;
storing results obtained by performing the at least one action in a results table; and
indexing the results in the results table such that the results can be accessed by the managed device at a later point in time.

4. The method of claim 3, further comprising:
receiving a done query at the managed device, the done query containing a work item identifier which identifies a previously requested work item;
analyzing the done query to determine the work item identifier;
referencing the results table with the work item identifier;
identifying an entry in the results table which is indexed with the work item identifier;
determining that the results in the results table which is indexed with the work item identifier has been completed; and
returning the results to a device which initiated the done query.

5. The method of claim 1, wherein during processing the managed device also generates a plurality of subsequent asynchronous messages for transmission to one or more managed devices.

6. The method of claim 5, wherein the asynchronous message comprises an SNMP message and wherein the plurality of subsequent asynchronous messages comprise two or more SNMP messages.

7. The method of claim 1, wherein the managed device comprises at least one server and a component within the server.

8. The method of claim 1, wherein the asynchronous message is encapsulated in at least one of a TCP and UDP packet, the method further comprising:
removing the asynchronous message from the packet within which the message is encapsulated; and
analyzing the asynchronous message.

9. An SNMP system, comprising:
a managing device adapted to generate and transmit an asynchronous message to a managed device and process a work item and wherein the managed device processes the work item such that the managed device generates a subsequent asynchronous message for transmission to another managed device, wherein the managed device is an SNMP work flow engine residing in a server, the SNMP work flow engine comprising a processing module and an SNMP daemon, wherein the processing module receives the asynchronous message and wherein the subsequent asynchronous message is transmitted via the SNMP daemon to at least one device not contained within the server.

10. The system of claim 9, wherein the managed device also places the work item in a work item queue comprising a plurality of work items to be performed for a plurality of different work item requestors.

11. The system of claim 10, wherein the managed device is further adapted to determine that the work item is the next work item in the work item queue to be processed, perform at least one action in conformity with the work item, store results obtained by performing the at least one action in a results table, and index the results in the results table such that the results can be accessed by the managed device at a later point in time.

12. The system of claim 11, wherein the managed device is further adapted to receive a done query, wherein the done query contains a work item identifier which identifies a previously requested work item, analyze the done query to determine the work item identifier, reference the results table with the work item identifier, identify an entry in the results table which is indexed with the work item identifier, determine that the results in the results table which is indexed with the work item identifier has been completed, and return the results to a device which initiated the done query.

13. The system of claim 9, wherein the managed device also generates a plurality of subsequent asynchronous messages for transmission to one or more managed devices.

14. The system of claim 13, wherein the asynchronous message comprises an SNMP message and wherein the plurality of subsequent asynchronous messages comprise two or more SNMP messages.

15. The system of claim 9, wherein the managed device comprises at least one of an integrated circuit card, a smart card, a subscriber identity module card, a security authentication module card, a printer, a reader, a component within a printer, a component within a reader, a server, and a component within a server.

16. The system of claim 9, wherein the asynchronous message is encapsulated in at least one of a TCP and UDP packet and wherein the managed device is adapted to remove the asynchronous message from the packet within which the message is encapsulated and analyze the asynchronous message.

17. A computer program product comprising computer executable instructions stored onto a non-transitory computer readable medium which, when executed by a processor of a computer, cause the processor to execute a method, the method comprising:
determining that an asynchronous message has been received at a managed device, the message containing instructions for the managed device to perform a work item; and
generating a subsequent asynchronous message for transmission to another managed device, wherein the managed device comprises an SNMP work flow engine residing in a server, the SNMP work flow engine comprising a processing module and an SNMP daemon, wherein the processing module receives the asynchronous message, and wherein the subsequent asynchronous message is transmitted via the SNMP daemon to at least one device not contained within the server.

18. The method of claim 17, wherein the managed device is also caused to place the work item in a work item queue comprising a plurality of work items to be performed for a plurality of different work item requestors.

19. The method of claim 17, wherein the managed device is also caused to generate a plurality of subsequent asynchronous messages for transmission to one or more managed devices.

* * * * *